H. HEINE.
PIN POINTING MACHINE.
APPLICATION FILED APR. 12, 1917.

1,351,849.

Patented Sept. 7, 1920.
5 SHEETS—SHEET 1.

Inventor.
Herman Heine
by Heard Smith & Tennant.
Attys.

H. HEINE.
PIN POINTING MACHINE.
APPLICATION FILED APR. 12, 1917.

1,351,849.

Patented Sept. 7, 1920.
5 SHEETS—SHEET 3.

Inventor.
Herman Heine
by Heard Smith & Tennant.
Attys.

H. HEINE.
PIN POINTING MACHINE.
APPLICATION FILED APR. 12, 1917.

1,351,849.

Patented Sept. 7, 1920.
5 SHEETS—SHEET 4.

Inventor.
Herman Heine
by Heard Smith & Tennant
Attys.

UNITED STATES PATENT OFFICE.

HERMAN HEINE, OF BROOKLYN, NEW YORK, ASSIGNOR TO A. KIMBALL COMPANY, OF NEW YORK, N. Y., A CORPORATION OF NEW YORK.

PIN-POINTING MACHINE.

1,351,849.    Specification of Letters Patent.    Patented Sept. 7, 1920.

Application filed April 12, 1917. Serial No. 161,468.

*To all whom it may concern:*

Be it known that I, HERMAN HEINE, a citizen of the United States, and resident of Brooklyn, county of Kings, State of New York, have invented an Improvement in Pin-Pointing Machines, of which the following description. in connection with the accompanying drawing, is a specification, like characters on the drawing representing like parts.

This invention relates to improvements in machines for pointing articles and the object thereof is to provide improved mechanism for reducing one end or both ends of an article to a conoidal or preferably ogival point.

More specifically the object of the invention is to provide mechanism for producing points upon blanks of soft wire for pins or staples to be utilized in the manufacture of pin tickets such as are used in marking textiles and like merchandise.

In the machines now generally in use in manufacturing pin tickets the wire is fed continuously across the path of a knife which severs the wire at an angle to its axis so that two points are simultaneously formed on adjacent blanks. The blanks severed are then bent into suitable form and affixed to the pin tickets in a well known manner.

The points produced by this cutting operation are unsatisfactory as they present edges which are sharp and more or less rough and often burred tips which will snag or cut the fibers of the fabrics when the pins are inserted into the fabric in attaching the pin tickets thereto.

The present invention contemplates the production of a machine which will form smooth conoidal or ogival points upon one or both ends of the pin blanks so that the points will penetrate the most delicate fabric without damaging the same.

By reason of the fact that the wire from which the pins for usual pin tickets are made is necessarily soft, pliable and non-resilient it has heretofore been found difficult if not impossible to produce smooth points upon the usual pin making machines for the reason that the pointing mechanism in such machines either will not point the blank properly or will bend the pliable wire blank so that it cannot be formed into a staple and set in the pin ticket in the usual manner.

One of the objects of the present invention is to provide a means which will so hold the wire from which the pin blank is severed that it will not be bent by the pointing mechanism.

Another object of the invention is to provide a novel means for automatically feeding the wire blanks consecutively to a rotatable receiving means or chuck which will rotate the blank while its end is being operated upon by an end reducing means.

Another object of the invention is to provide a receiving means or chuck capable of holding one or preferably a plurality of blanks in such a manner that the remote ends of said blank or blanks may be simultaneously presented to the end reducing means.

Another object of the invention is to provide an end reducing means in the form of a rotary cutter or grinder having an extended, preferably cylindrical, surface and to provide means for moving the rotating receiving member or chuck relatively to said end reducing means in such a manner that the end of the blanks to be pointed will be caused to travel across the faces of the end reducing means so that substantially the entire surface of the cutter will act upon the blank, thereby producing a more effective action and also prolonging the life of the cutter.

Another feature of the invention consists in pivotally, and preferably adjustably mounting the rotating end reducing means in such a manner as to permit oscillation of the same in the direction of the axis of the blank and in so positioning the cutter that the axis of the blank will be substantially tangential to the revolving surface of the cutter.

A further object of the invention consists in providing means for so moving the cutter that it will reduce the end of the blank to a convexedly tapered or ogival form.

Another object of the invention is to provide a novel form of chuck in which the gripping members are adapted to be separated to receive a blank and which are closed by the means which serves to rotate said gripping members.

A further feature of the invention consists in slidably supporting the entire chuck mechanism so that it may be reciprocated from the position in which it receives the blank across the end reducing members in the manner above described.

Another object of the invention is to provide a novel feeding mechanism which will insure uniform advancement of the end of a coil of wire to the cutting mechanism so that blanks of equal length will be severed therefrom.

Another object of the invention is to provide means for engaging and directing the free end of the wire to the chuck and for holding said wire while it is being severed by the knife.

Another feature of the invention resides in providing a novel means for delivering the finished blanks to a suitable receptacle and for arranging the pointed blanks in parallelism therein.

Other objects and features of the invention will more fully appear from the following description and the accompanying drawings and will be pointed out in the annexed claims.

A preferred embodiment of the invention is illustrated in the accompanying drawings in which.

The machine illustrated in the drawing comprises a bed plate 1 having suitable standards 2, 3 rising therefrom and provided at their upper ends with journals 4, 5 for a main shaft 6 which is provided with suitable cams for actuating the various mechanisms. The standard 2 has a lateral extension or bracket 7 providing journals 8 for a preferably vertical counter shaft 9 which may be driven in any suitable manner and which has a beveled gear 10 meshing with a gear 11 on the main driving shaft 6 to actuate the latter. The opposite end of the shaft 6 may be provided with a fly wheel 12 to insure uniform rotation of the shaft notwithstanding the intermittent actuation of the various mechanisms.

In the machine disclosed herein the wire is fed intermittently into a chuck, a predetermined length of wire being severed immediately after being thrust into the chuck jaws. The feeding mechanism may be so arranged as to force such a length of wire into the chuck that its end will extend beyond the remote end of the chuck so that when the wire is severed both ends of the blank will project beyond the ends of the chuck. Preferably, however, the feeding mechanism is so arranged as to thrust the end of the wire but half way through the chuck, the succeeding movement of the feeding mechanism serving to force the first blank introduced into the chuck forward until its end projects beyond the end of the chuck, then severing the wire, thus enabling the chuck to carry two blanks arranged in axial alinement therein.

After the blanks have thus been introduced into the chuck and severed the chuck is moved laterally in a direction at right angles to its axis across the field of operation of the cutters.

The cutters may be of any desirable form, either stationary or rotating but preferably are cylindrical cutters reciprocably mounted in such a manner that they may be moved in the direction of the axis of the chuck to engage and reduce the end or ends of the blank.

Any suitable means may be utilized for supporting and reciprocating these cutters. Preferably however, the cutters are mounted upon swinging arms and said arms are actuated to move the cutters gradually toward the ends of the blanks which are rotated in the chuck, the cutters being so positioned that the arc of their movement will reduce the end or ends of the blanks to ogival form. During the cutting operation the chuck desirably is moved in the direction of the length of the cutters so that the end of the blank will traverse substantially the full length of the cutters during the cutting operation, thereby increasing the efficiency of the cutter and preventing a groove from being worn therein.

A preferred form of mechanism for accomplishing this purpose is illustrated in the accompanying drawings in which the wire W after passing through the usual straightening mechanism, not shown, is led into a feeding mechanism by which it is presented to the chuck.

The feeding mechanism comprises a stand 13, (see Figs. 1, 2, 9 and 10) suitably secured to the bed 1 and provided with a lateral lip 14 channeled to form a way 15 for a suitable slide 16 having a T-shaped end, one limb of which engages the guideway 15 and the other limb of which is located in a guideway formed by a plate 17 suitably secured to the upper end of the stand 13.

Figure 9:
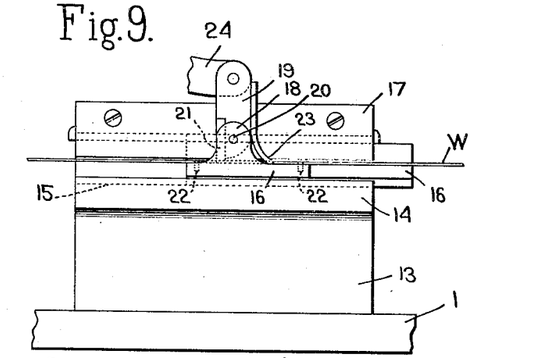
Fig. 9 is a detail elevation of the wire feeding mechanism.
Figure 10:
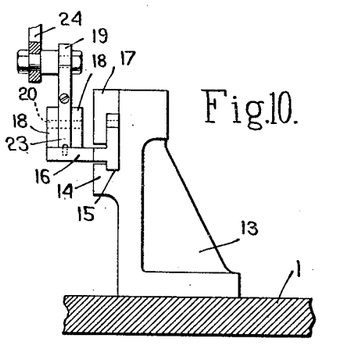
Fig. 10 is an end view of the wire feeding mechanism partly in elevation and partly in section.

The slide 16 has upwardly projecting ears 18 in which a clamping member 19 is pivotally mounted upon a stud 20. The clamping member 19 is provided with a hardened plate 21 the extremity of which is substantially tangential to the face of the slide 16 and serves to coöperate with the slide to clamp the wire. The slide 16 is also preferably provided with guiding pins 22 of hardened steel, which may have grooved upper ends and which serve to support the wire on opposite sides of the point of its engagement by the clamping member 19.

A guide and stop 23 is secured to the rear edge of the clamping member and serves to limit the rocking movement of said clamping member and thereby to cause the rearward movement of the slide in the manner which will be hereinafter more fully described.

The clamping member 19 is pivotally connected at its upper end to a link 24 which, as illustrated herein, extends across the machine and is adjustably connected by a pin and slot connection to the end of an arm 25 upon a rock shaft 26 which is mounted in a suitable stand 27 located adjacent the opposite end of the machine, said rock shaft 26 being provided with an arm 28 which has a cam roller 29 engaging the groove of a cam 30 which is carried by the main shaft 6.

In the operation of the feeding device the reciprocation, to the left, of the link 24 first rocks the clamping member 19 about the pivot 20 until the plate 21 engages and clamps the wire against the slide. A further movement, to the left, of the link 24 causes the slide to move in its guideway in the stand and to feed the wire toward and into the chuck. The length of wire thus fed into the chuck may be regulated by the adjustment of the bolt and slot connection between the end of the link 24 and the arm 25 of the cam actuated rocker.

Upon the reversed movement, to the right, of the link 24 the initial movement rocks the clamping member 19 upon its pivot 20 and releases the plate 21 from engagement with the wire. As soon as it has rocked sufficiently thus to become disengaged the stop 23 engages the upper face of the slide and prevents further pivotal movement of said clamping member so that continued movement of the link 24 to the right forces the slide back to its original position again to engage and feed a succeeding length of wire to the chuck.

Any suitable mechanism may be used for guiding the wire as it is being presented to the chuck and for severing a predetermined length of the same. In view, however, of the tendency of the free end of the wire to vibrate laterally during the feeding movement a special means is provided for directing the free end of the wire into the chuck, this means being conveniently supported upon the stand which carries the knife for severing blanks from the wire.

Figure 7:
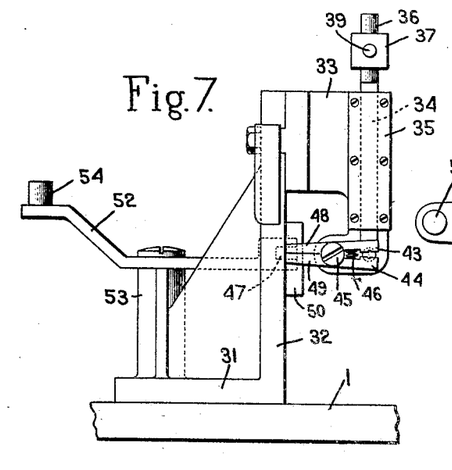
Fig. 7 is a detail side elevation of the knife, the guiding means and the means for actuating the latter.
Figure 8:
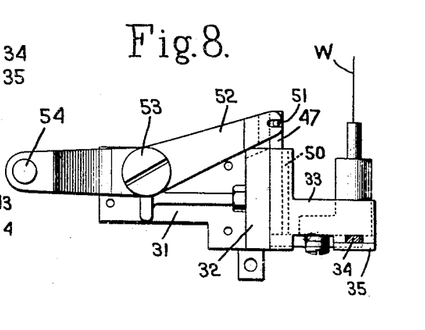
Fig. 8 is a plan view of the same.

The knife stand 31 which is suitably secured to the base comprises a vertical standard 32 to the upper end of which is clamped a bracket 33 having a vertical groove in which a knife 34 is reciprocably mounted and clamped therein by a cover plate 35. The lower end of the bracket 33 is apertured to permit the passage of the wire therethrough and a hardened sleeve in said aperture forms a ledger blade which coöperates with the knife. The knife 34 desirably has at its upper end a cylindrical portion 36 upon which a head 37 is adjustably secured by a set screw 38. The head 37 has a laterally extending stud 39 which engages a lever 40 which is pivotally mounted upon a suitable stud 41 projecting from a stand which carries certain other mechanism hereinafter to be described, said lever 40 engaging at its opposite end a cam 42 upon the main shaft 6 of the machine. The oscillation of the lever 40 reciprocates the knife in an obvious manner. In order to guide the end of a wire into the chuck jaws a pair of pivotal guiding members or jaws are provided which embrace the wire just beyond the path of the knife above described.

The guides, as illustrated herein comprise jaws 43, 44 pivotally mounted upon a stud 45 extending laterally from an ear upon the bracket 33. The guides 43, 44 have concaved faces approximately to fit the wire and are normally separated by a helical spring 46 interposed between said jaws and located between the jaws and their pivot. The jaws are actuated to close loosely upon the wire by a wedge 47 which is reciprocated between extensions or tails 48, 49 of said jaws. The wedge 47 is mounted in a guideway in a bracket 50 secured to the standard 32 and is provided at its end with a pin 51 which engages the slot in the end of the lever 52 which is pivotally mounted upon a boss 53 extending upwardly from the base 31 of said stand, the opposite end of said lever being offset and provided with a cam roll or follower 54 which engages a suitable cam 55 secured to the main shaft 6.

The cam 55 is so designed that it will actuate the lever 52 to force the wedge 47 between the tails 48, 49 of the jaws and close the jaws just as, or just before, the feeding operation begins but will release the jaw from engagement with the wire before the cutter is actuated to sever it.

The mechanism thus described is adapted to cut blanks from the end of a coil of wire and present the same to a suitable mechanism which will hold and present the end of the blank to a suitable reducing means. However, other means may be provided for presenting blanks or for cutting and presenting blanks to the mechanism for rotating and pointing said blanks.

The chuck.

One of the most important features of the invention resides in the mechanism for receiving and rotating the blank and presenting the same to suitable end reducing devices. As illustrated in the accompanying drawing the receiving device is in the form of a chuck adapted to grip the blank which is presented to it, then to rotate it and thereupon to present the rotating blank to the cutters and cause the same to traverse across the face of the cutters.

Figure 1:
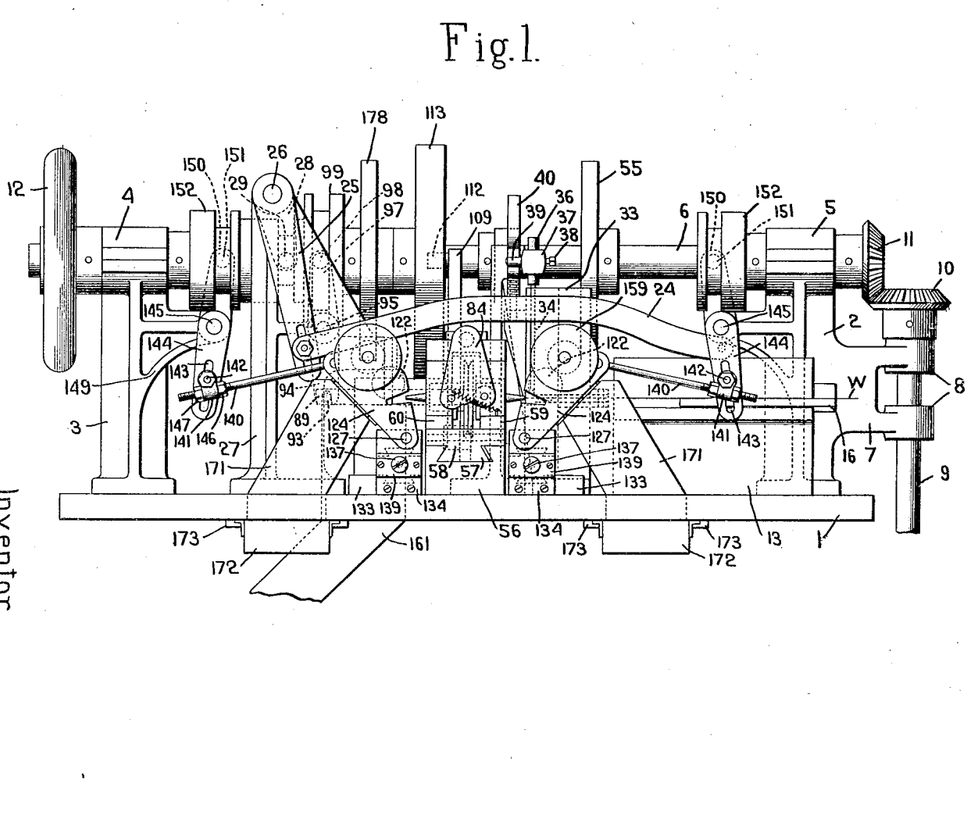
Figure 1 is a side elevation of a machine particularly adapted for pointing both ends of pin blanks to be used in the manufacture of pin tickets.
Figure 2:
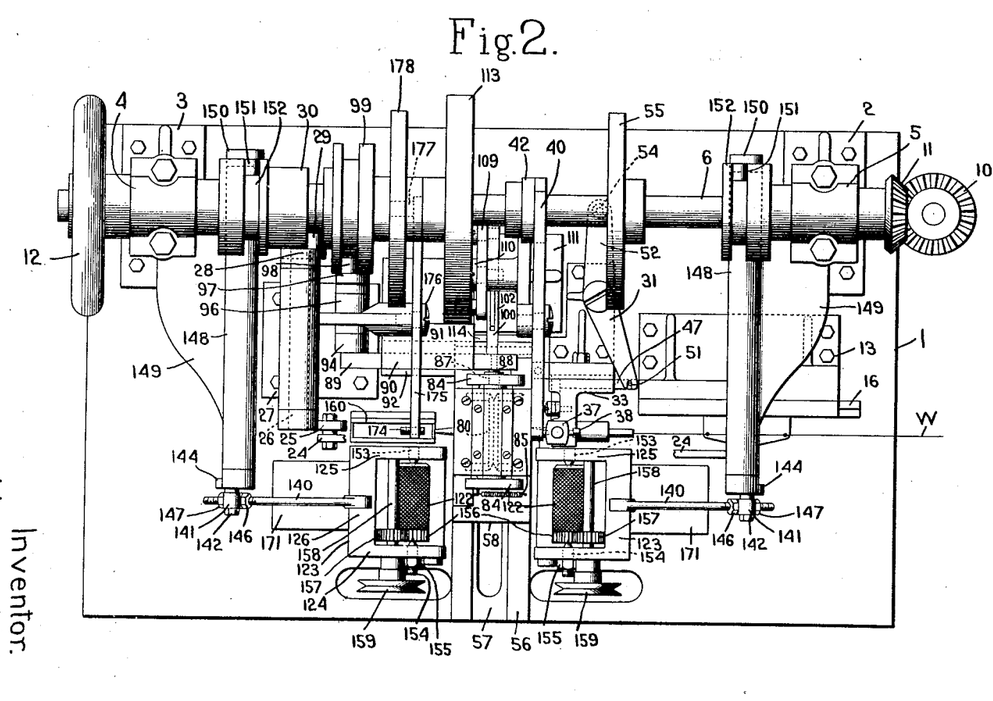
Fig. 2 is a plan view of the same.
Figures 4, 5:
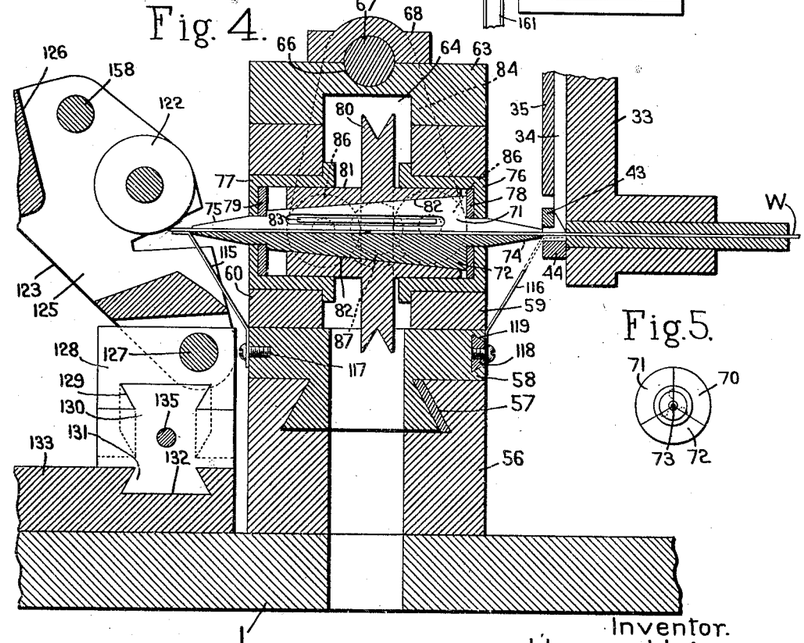
Fig. 4 is a detail view showing in vertical sections the chuck for holding the blank, the means for guiding the blank into the chuck, the knife and also the rotary cutter and its support,—the latter section being taken in a different vertical plane than the former.
Fig. 5 is a detail end view of the chuck.
Figure 6:
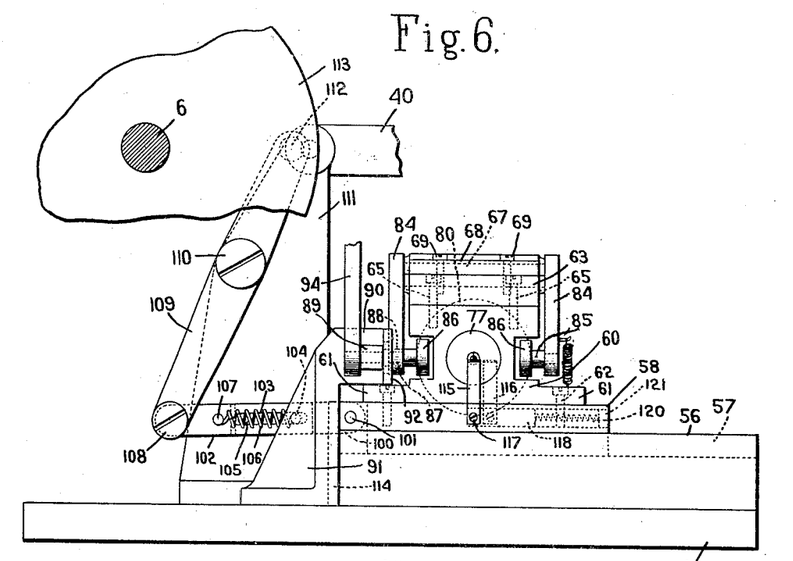
Fig. 6 is a detail side elevation of the chuck carrier and a portion of the mechanism for actuating it.

In the preferred embodiment shown in the accompanying drawing, which is illustrated in Figs. 1 and 2, and in detail in Figs. 4 and 6, the chuck is mounted upon a slide which is reciprocated transversely of the bed plate of the machine. A plate 56 is rigidly secured upon the bed plate preferably about centrally of the machine and has in its upper face a dove-tailed guideway 57. A slide 58 having a depending dove-tailed rib fitting into the guideway 57 is reciprocably mounted upon the plate 56 and the chuck holder is rigidly secured to said slide.

The plate 56 and the slide 58 are longitudinally apertured to provide clearance for a belt for rotating the chuck. The chuck holder is rigidly secured to the slide 58 and as shown herein comprises sections 59, 60 having extensions 61 secured to the slide 58 by screws 62. The central portion of the chuck holders 59, 60 are provided with recesses extending inwardly from the ends to provide a clearance for the guide wheels for the sheave of the chuck as will hereinafter more fully appear, so that the chuck holders are somewhat of T-shaped form. A cap plate 63 having a central recess 64 is secured to the chuck holders 59, 60 by screws 65.

The cap 63 has at its top a cylindrical recess 66 which forms the lower half of a bearing for a rock shaft 67 which carries at its end brackets which support the guide rolls for the chuck rotating sheave.

A cover plate 68 secured to the cap 63 by screws 69 serves to form the other half of the journal for the rock shaft 67. The chuck proper is formed of a plurality of separable sections or jaws 70, 71, 72 having a central groove 73 adapted to fit tightly upon the wire blank which is fed into it. These chuck jaws are provided with similar extensions 74, 75 which project through central apertures in cup shaped bearings 76, 77 seated in central apertures in the sections 59, 60 of the chuck holder.

Hardened wear plates 78, 79 are interposed between the ends of the jaws and the inner walls of the bearings 76 and 77. The exterior surface of the sections 70, 71 and 72 of the chuck is of conoidal form and a sheave 80 having a hub 81 is rotatably mounted in the cup shaped bearings 76, 77 upon said chuck sections, the interior of said hub having a tapered wall 82 complementary to the taper of the external surface of the chuck sections 70, 71 and 72. The cup shaped bearings 76, 77 are of sufficient length to permit the head of the sheave to slide in the direction of its axis, thereby permitting the hub to be used to force together the sections of the chuck into clamping engagement with the blank which is inserted between them.

Leaf springs 83 located in recesses in each of the chuck sections and bearing against the adjacent wall of the neighboring chuck section tend normally to extend the chuck sections or jaws so that the blank can be introduced between them. The chuck sections are forced together by the sliding movement of the hub of the sheave in the cup shaped bearings and a suitable spring connected to one of the hangers and the chuck holder 59 retains the hub in locked position during the reciprocation of the chuck.

Any suitable mechanism may be employed for moving the hub of the sheave in an axial direction to clamp the chuck jaws together or to permit their separation under the influence of the springs 83. A convenient means which is illustrated herein comprises two pairs of anti-friction members such as rollers, mounted upon hangers which are secured to the ends of the rock shaft 67. As illustrated herein these hangers are in the form of triangular plates 84 which are secured near their apexes to the rock shaft 67 and at their lower ends provided with laterally extending studs 85 carrying rollers 86 which engage lightly upon the parallel sides of the sheave 80. It will be apparent that when the triangular hangers 84 are rocked in unison on the shaft 67 the rollers 86 pressing against one side or the other of the sheave 80 will serve to slide its hub longitudinally in its bearings and thereby to cause its conical inner face to close the chuck,—when moved in one direction,—or to open when the sheave is moved in the opposite direction. The hangers are normally under the influence of a spring which tends to hold the hub 81 of the sheave 80 in chuck closing position.

Any convenient means may be provided for actuating the hangers in the manner aforesaid. As illustrated in the accompanying drawings one of the hangers 84,—that shown at the left side, Fig. 6,—is provided centrally of its lower end portion and between the studs 85 with an aperture 87, which may if desired have a bushing, and which is adapted to be engaged, when the chuck is returned to the position in which it receives a blank, by a pin 88 projecting laterally from a slide bar 89 which is mounted in guideways in a lateral projection 90 of a stand 91 suitably secured to the bed plate near the left end of the machine as seen in the drawings.

The slide 89 is held in its guideway by a retaining plate 92. This slide 89 has at its opposite end a pin 93 which engages a slot in the lower end of an arm 94 of a rock shaft 95 which is journaled in suitable bearings in ears 96 projecting laterally from the stand 27, said rock shaft being provided at its opposite end with an arm 97 having at its end a roller 98 which engages a groove in a cam 99 fast upon the main shaft 6.

The cam 99 is so designed as to operate only when the chuck is in position to receive a blank from the feeding and cutting mechanism, for during the end reducing operation the chuck is moved bodily away from the sliding bar 89. It is therefore necessary that the cam 99 shall so actuate the slide bar 89 that the pin 88 will be positioned to enter the aperture 87 in the hanger 84 when the chuck is returned to blank receiving position.

Any suitable mechanism may be provided for reciprocating the chuck from receiving position into the field of the end reducing means or cutters, preferably means being provided for giving the chuck a sufficient reciprocation to bring the ends of the blanks to be pointed into the field of operation of the cutter and further to cause the ends to traverse the length of the cutter. A convenient mechanism for accomplishing this purpose is disclosed herein which comprises an extensible link connected to the chuck slide or carriage 58 and actuated by a suitable cam upon the cam shaft. The carriage oscillating link comprises a section 100 pivotally secured to a stud 101 in the end of the carriage or slide 58 and a section 102 having a bifurcated end to receive the end of the link section 100. The link section 102 is provided with a slot 103 in which guiding pins 104 and 105 reciprocate. The pin 104 preferably is extended and connected by a helical spring 106 to a post 107 projecting laterally from the link section 102. The outer end of the link 102 is pivotally connected to a stud 108 at the lower end of a lever 109 which is fulcrumed upon a stud 110 carried by the bracket 111 which also carries the pivotal stud 41 of the knife actuating lever. The upper end of the lever 109 has a cam roller 112 which engages a suitable cam groove in the cam disk 113 fixedly secured upon the main shaft 6. In the operation of the machine the oscillation of the lever 109 acts through the expansible link 100, 102 to reciprocate the chuck carrier or slide 58.

In view of the small diameter of the blanks which are to be operated upon it is of course, necessary that the chuck shall always return into accurate alinement with the mechanism for delivering the blanks to the chuck. The present mechanism accordingly is designed to prevent any failure of the chuck to return to exactly receiving position by reason of the wear on the pivotal connection between the actuating parts.

This is accomplished in the present invention by providing a permanent rigid stop plate 114 in the path of the end of the chuck carriage or slide 58 and by connecting the carriage to the operating lever 109 by the expansible link 100, 102 which is so constructed as to permit further movement of the lever 109 after the carriage has been arrested.

This construction also prevents any rebounding of the chuck carriage when suddenly arrested.

It is, of course, necessary that the end or ends of the blanks project beyond the end of the chuck jaws to enable the end reducing mechanism to operate upon the same and in view of the soft and pliable character of the wire from which the pin blanks are made it is desirable that means shall be provided for supporting these projecting ends during the operation of the end reducing mechanism. A suitable means for supporting the ends which is illustrated herein consists of brackets 115, 116 supported by the chuck carriage 58 and having horizontally extending ends located at the ends of the chuck jaws and extending in alinement therewith a distance almost equal to the length of the projecting portion of the blank being operated upon. The bracket 115 may be rigidly secured to the slide by suitable screws 117.

The bracket 116 however, which is carried by the side of the chuck carriage facing the blank feeding mechanism must be removed from its operative position during the insertion of the blank in the chuck. This is accomplished by securing the bracket 116 upon a supplementary slide 118 which is slidably mounted in a preferably dove-tailed way 119 in the side of the carriage 58.

A spring 120 located within the slide and bearing at its outer end against a stop or plug 121 normally forces the slide 118 against the end of the guideway to position the bracket 116 beneath the projecting end of the blank. When, however, the chuck is reciprocated into receiving position the upper end of the bracket 116 engages the lower guiding jaw 44, which directs the blank into the chuck and prevents further movement of the bracket so that the slide 118 is forced outwardly against the action of the spring 120 as the chuck jaws move into receiving position. When a blank has been thrust into the chuck jaws and the chuck carriage is advanced to present the blanks to the end reducing means the spring 120 promptly forces the slide 118 to its normal position and positions the end of the bracket 116 beneath the projecting end of the blank before the end pointing means engages the blank.

*The end reducing mechanism.*

Any suitable type of end reducing means may be employed within the purview of my invention, preferably however the end reducing means is in the form of a cylindrical cutter having a file-cut surface, means being provided for reciprocating the cutter in the direction of the axis of the chuck while the chuck is being moved transversely thereof so that substantially all of the surface of the cutter will be caused to engage the end portion of the blank.

Inasmuch as the present invention is designed to point both ends of a blank or preferably to point the remote ends of two blanks carried by the chuck, the end reducing means are duplicated and are actuated to engage the projecting ends of the blank or blanks either simultaneously or alternately as may be desired.

The cutters may be reciprocated into engagement with the blanks by any suitable means but preferably are pivotally mounted in such a manner as to have an arcuate movement toward the blanks so as to form curvedly conical or ogival tips upon the blanks.

In the preferred embodiment of the invention illustrated herein the end reducing means are in the form of cylindrical cutters 122 which are journaled in brackets 123 having end pieces 124, 125 connected at the top by an integral cross piece or yoke 126. The ends 124, 125 of the brackets 123 are pivotally mounted upon stub shafts 127 carried by a vertically adjustable stand 128 supported upon the bed plate 1. Any suitable means may be provided for vertically adjusting the supporting stand for the cutter carrying brackets.

Figure 13:
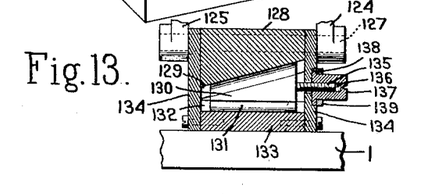

The stand 128 for the cutter carrying bracket 123 has an inclined dove-tailed groove 129 in its lower face in which is seated a tapering dove-tailed adjusting member 130 which is also provided with a dovetail 131 which is slidably mounted in a complementary dove-tail guideway 132 in a base plate 133 which is bolted to the base 1.

End plates 134 (see Fig. 3) are secured to the end of the base plate 133 and extend above the same into engagement with the end of the stand 128 and serves to guide the end of the latter in its vertical adjustment. The tapered adjusting member 130 may be moved longitudinally to raise and lower the stand 128 by any suitable mechanism. As shown herein the tapered member has a screw threaded stud 135 projecting from its end and engaging the internally screw threaded wall of an aperture 136 in a nut 137 having an enlarged portion 138 seated in a complementary recess in the end plate 134 and retained therein by a cap plate 139 suitably secured to the end plate 134. By rotating the nut 137, therefore, the wedge shaped adjusting member 130 will raise and lower the stand 128 upon which the cutter bracket 123 is pivotally mounted.

Figure 3:
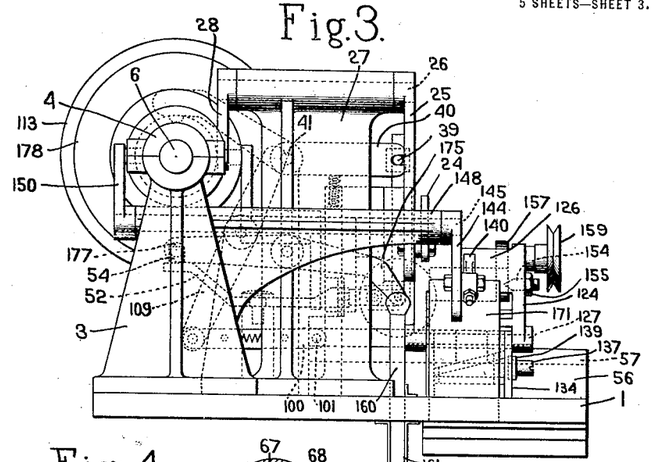
Fig. 3 is an end elevation of said machine, the fly wheel being omitted.

The brackets 123 may be oscillated to move the cutters into and out of cutting engagement with the ends of the blank by any suitable mechanism. As illustrated herein a link 140 is pivotally connected to the cross piece 126 and is adjustably secured at its end to a sleeve 141 which is pivotally connected to a stud 142 adjustably mounted in a slot 143 in the arm 144 of a cam actuated rock shaft 145. An adjustable connection between the rod 140 and sleeve 141 is conveniently made by threading the end of the rod 140 and placing thereon nuts 146 and 147 adapted to engage opposite ends of the sleeve 141. These adjustments provide means for varying the speed of the cutter and also for varying the timing of the action of the cutter upon the blank.

The rock shaft 145 is journaled in an extended bearing 148 which is carried by a bracket 149 extending from and preferably integral with the end standard 3. The rock shaft 145 is provided at its other end with an arm 150 having a roller 151 engaging the groove of a cam 152 carried by the main shaft 6. In the operation of the device the rotation of the cam 152 causes the oscillation of the rock shaft 145 thereby reciprocating the link 140 and causing the same to rock the cutter carrying bracket 123 about its pivot 127 so that the cutter moves in an arc across the path of the blank.

It is desirable that a relatively long taper be made upon the end of the blank and consequently the cutting roll 122 is positioned so that in its initial engagement with the end of the blank the axis of the blank will lie substantially tangential to the revolving surface of the cutter.

Any suitable form of cutter or grinder may be employed. As disclosed herein the cutter 122 is in the form of a steel cylinder having a file cut surface and provided at its ends with conical recesses adapted to be engaged by hardened conical pins 153, 154 projecting inwardly from the end walls 124, 125 of the bracket 123. The pin 153 may be permanently seated in the end 125 of the bracket while the pin 154 desirably is screwed through the bracket 124 and locked in adjusted position therein by a nut 155. By this means the bearings for the cutter may be adjusted to take up wear.

The outer end of the cutter 122 is provided with a gear 156 which meshes with a gear 157 upon a shaft 158 journaled in the bracket ends 124, 125, the shaft 158 having at its end a pulley 159 adapted to be driven by a suitable belt extending downwardly through an aperture 160 in the bed plate and actuated from a countershaft, not shown.

Inasmuch as the cutters are identical in form and operation a description of one of the cutters is applicable to both and corresponding parts have been identified by the same numerals upon the drawings.

The cams 113 and 152 are so designed and located upon the shaft 6 that the cutters will be oscillated to engage the ends of the blank simultaneously with the reciprocation of the chuck carriage and chuck therebetween so that the ends of the blanks will be caused to traverse substantially the full length of the cylindrical surface of the cutters during the pointing operation. It will however, be understood that the cams may be otherwise designed to cause the cutters to approach and recede in definitely timed relation to the reciprocation of the chuck and that instead of engaging simultaneously the ends of the blanks they may be caused alternately to engage the ends of the blanks which are presented to the respective cutters.

When the pin blanks have been pointed in the manner aforesaid and the chuck returned to normal position a new blank is fed in and the outermost completed blank is thereby thrust from the chuck and may be received in a chute which will deliver it to any suitable receptacle.

In order properly to package double pointed pins however, a special mechanism is disclosed herein for depositing the pins in a pin box in such a manner that they will lie in parallelism therein.

Figure 11:
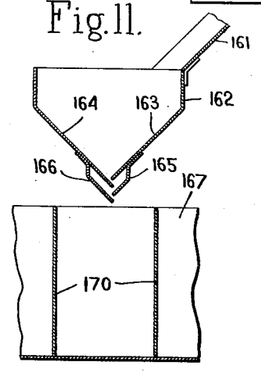
Fig. 11 is a vertical sectional view of the hopper which receives and positions the pointed articles showing its relation to the pin receiving box.

In the embodiment of the invention disclosed in the accompanying drawings the pointed pins are delivered to a vertical chute 160, which is secured to the upper face of the bed 1 and directs the pins through a slot in said bed into a chute 161 which leads to a hopper 162. The bottom of the hopper 162 has inclined walls 163, 164 one of which overlaps the other leaving a space therebetween of sufficient width to permit a pin to roll through.

Overlapping plates 165, 166 having their edges parallel to the edges of the bottom plates 163, and 164 of the hopper desirably are provided to cause the pins to roll back and forth sufficiently to insure their delivery from the hopper in predetermined axial position.

Figure 12:
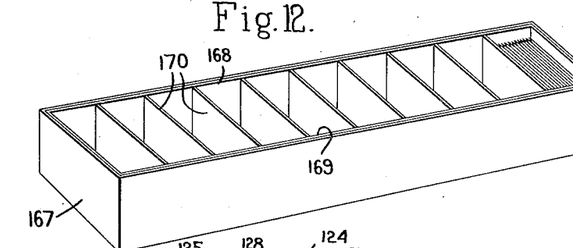
Fig. 12 is a perspective view of the pin receiving box, and, Fig. 13 is a detail sectional view of a means for adjusting the pivotal supports for the oscillating cylindrical cutters.

The hopper desirably discharges into a pin box 167. This pin box desirably is in rectangular form and of a width slightly greater than the length of the pins so that the pins may lie in parallelism transversely of the box. In order to insure the proper positioning of the pins in the box as they are dropped from the hopper, the box is provided with a skeleton frame having sides 168, 169 connected by transverse cross pieces 170 placed a short distance apart so that the properly positioned pin dropping from the hopper will be caused to lie parallel in the pin box. These partitions furthermore, provide means by which the box may be gradually filled from one end toward the other without allowing the pins to roll down the other side of a pile and thereby become disarranged.

In the operation of the machine one end of the pin box is placed beneath the hopper by an attendant and as soon as one section is full is moved forward by hand or automatically until the next section is filled, etc. When all the sections are filled the inner skeleton frame is removed leaving the pins in paralleleism in the pin box.

In order to dispose of the cuttings or filings removed from the blanks by the cutters, suitable dust chutes 171 are positioned with their upper ends adjacent to the cutters, the lower ends of said chutes delivering the cuttings through suitable apertures in the bed plate to dust boxes 172 removably supported by ways 173 beneath said bed.

In the operation of the machine wire is carried from a continuous coil to the wire feeding mechanism in which it is carried upon the slide 16 beneath the gripping member 19. The reciprocation of the gripping member 19 through the link 24 which is actuated by the cam 30 advances the slide and forces the end of the wire into the chuck jaws. As the wire is advanced the jaws 43 and 44 are closed upon the same to guide the end of the wire into the chuck jaws. These jaws are actuated by the wedge 47 which enters between the tails 48, 49 of said jaws, said wedge being actuated by the lever 52.

As soon as the predetermined length of the end of the wire is introduced into the chuck the knife 34 is actuated to sever the blank from the wire. The chuck jaws 70, 71 and 72 are thereupon closed upon the blank by the longitudinal reciprocation of the hub of the sheave 80 upon the conoidal exterior of the chuck sections 70, 71, 72. This longitudinal movement of the hub of the sheave 80 is effected by the oscillation of the hanger 84 which causes the rollers 86 to force the sheave in the direction of its axis, the hangers 84 being actuated through the slide bar 89, the rock shaft 95 and cam 99.

When the chuck jaws have been thus closed into gripping engagement with the blank inserted therein, the chuck is reciprocated by the cam 113 which acts through the lever 109 and the extensible link 100, 102, so that the blank is carried into the field of operation of the cutters 122 and is caused to traverse longitudinally of the cutting surface thereof. In the meantime the cutters 122 are oscillated by the cams 152 through the rock shaft 145 and link 140 to move in an arcuate path in their engagement with the ends of the blank so that the ends of the blanks are tapered to an ogival form.

It has heretofore been mentioned that in the mechanism herein disclosed the cutters are adapted simultaneously to act upon the remote ends of two blanks held in axial alinement in the chuck. In the first movement of the chuck after a blank has been inserted therein the end of the blank which has just been severed and is projecting from the receiving end of the chuck is presented to its cutter and reduced to a point. When the next blank is inserted into the chuck its severed end engages the pointed end of the preceding blank and forces it along the chuck jaws until its opposite end projects beyond the opposite end of the chuck jaws. In order to prevent the blank thus forced forward from being thrust out or improperly positioned in the chuck a stop is provided to engage the outer end of the blank when it is in proper position in the chuck. This stop as illustrated herein consists of a stud 174 adjustably screwed in the end of a lever 175 which is pivotally mounted upon a stud 176 carried by the stand 27, the opposite end of the lever 175 being provided with a cam follower 177 which engages a cam 178 on the cam shaft.

In the next forward reciprocation of the chuck the remote ends of the two blanks held in the jaws of the chuck are presented to the cutters 122 which reduce them simultaneously. When the next length of wire is fed into the chuck the completed pin is forced from the chuck and the remaining blank advanced until its end engages the stop 174 which in the meantime has been positioned in its path by the action of the lever 175 which is operated by the cam 178. The completed pin which drops from the chuck is carried by the chute 160 and 161 to the hopper 162 from which it is delivered to the pin box 167 in the manner aforesaid.

It will be understood that the embodiment of the invention disclosed herein is illustrative of the principles of my invention but is not restrictive and that various modifications in construction, form and arrangement, may be made within the spirit and scope of the following claims.

Having thus described my invention what I claim as new and desire to secure by Letters Patent is:

1. A machine for pointing articles comprising means for receiving and rotating said articles, a cylindrical cutter, means for rotating the same, means for moving said cutter in the direction of the axis of said receiving means and means for reciprocating said receiving means in the direction of the axis of said cylindrical cutter to cause the end of the article to traverse across the surface of said cutter.

2. A machine for pointing articles comprising means for receiving and rotating an article, a cylindrical cutter, means for reciprocating said receiving means transversely of the direction of its axis, and means for oscillating said cutter in an arcuate path crossing the axis of the article receiving means to cause the cutter to engage the end of the rotating article and reduce the same to a convexedly tapered point.

3. A machine for pointing articles comprising means for receiving and rotating an article, a cylindrical cutter, means for pivotally supporting said cutter to oscillate in an arcuate path crossing the axis of said article receiving means, means for oscillating said cutter supporting means to cause the cutter to engage the end of the rotating article and reduce the same to a convexedly tapered point, means for adjusting the pivotal support of said cutter, whereby the position of the arc of oscillation of the cutter relative to the axis of the rotating blank may be adjusted and means for reciprocating said article receiving means in the direction of the axis of said cylindrical cutter.

4. A machine for pointing articles comprising a chuck for receiving and rotating said article, a cylindrical cutter, a bracket supporting said cutter pivotally mounted upon a stand, means for adjusting said stand vertically including a wedge shaped member slidably mounted beneath said stand, means for adjusting said wedge shaped member.

5. A machine for pointing articles comprising a chuck for receiving and rotating said article, a cylindrical cutter, a bracket supporting said cutter pivotally mounted upon a stand, means for adjusting said stand vertically including a wedge shaped member slidably mounted beneath said stand, and a screw threaded stud projecting from said member engaging a nut rotatably and fixedly secured upon a stationary part of the machine.

6. A machine for pointing articles comprising a rotatable chuck, means for delivering blanks successively to said chuck, a cylindrical rotary cutter, means for causing said cutter to advance toward and from the end of said article and means for reciprocating said chuck to cause the end of said article to traverse the cylindrical surface of said cutter.

7. A machine for pointing pins comprising a rotatable cutter, a rotary chuck, means for presenting a wire to said chuck, means for severing said wire when its end portion is positioned within said chuck, means for rotating said chuck and means for reciprocating said chuck to cause the same to present the end of said article to said cutter.

8. A machine for pointing pins comprising a rotatable cutter, a rotary chuck, means for presenting a wire to said chuck, means for severing said wire when its end portion is positioned within said chuck, means for rotating said chuck, means for reciprocating said chuck to cause the same to present the end of said article to said cutter, and means for supporting the end of the blank which projects beyond the end of the chuck during the cutting operation.

9. A machine for pointing pins comprising a rotatable cutter, a rotary chuck, means for presenting a wire to said chuck, means for severing said wire when its end portion is positioned within said chuck, means for rotating said chuck, means for reciprocating said chuck to cause the same to present the end of said article to said cutter, means for supporting the end of the blank which projects beyond the cutter during the cutting operation, and means for removing the same from supporting position when the chuck is moved to blank receiving position.

10. In a machine for cutting and pointing wire blanks a rotary chuck, feeding means for automatically thrusting the end of a continuous wire into said chuck, relatively movable guiding members and means for actuating the same to cause them to embrace the end portion of said wire and guide it into the chuck, end reducing means and means for reciprocating said chuck to present the end of the blank to said end reducing means.

11. In a machine for cutting and pointing wire blanks, a rotary chuck, feeding means for automatically thrusting the end portion of a continuous wire into said chuck, pivotally mounted guiding jaws positioned to embrace the end of said wire and direct it to the chuck, a wedge reciprocably mounted between the tails of said jaws, means for reciprocating said wedge to actuate said jaws, means for severing the wire, end reducing means and means for reciprocating said chuck to present the end of the blank to said end reducing means.

12. In a machine for pointing blanks, a chuck comprising expansible gripping members having means for engaging the blanks throughout their length, means for rotating said gripping members and means for causing relative movement between the rotating means and said gripping members to effect the closing of said gripping members.

13. In a machine for pointing blanks a chuck comprising separable gripping members having an externally tapered body and blank engaging means extending throughout their length, a sheave having a hub with a bore tapered complementary to the taper of said gripping members, means for rotating said sheave and means for moving the same in the direction of its axis to close said gripping members.

14. In a machine for pointing blanks a chuck comprising separable gripping members having an externally tapered body, a sheave having a hub with a bore tapered complementary to the taper of said gripping members, means for rotating said sheave, means for moving the same in the direction of its axis to close said gripping members comprising rollers engaging the flat face of said sheave and means for actuating said rollers.

15. In a machine for pointing blanks a chuck comprising separable gripping members having an externally tapered body, a sheave having a hub with a bore tapered complementary to the taper of said gripping members, means for rotating said sheave, means for moving the same in the direction of its axis to close said gripping members comprising a hanger having pairs of rollers engaging opposite sides of said sheave and means for oscillating said hangers in the direction of the axis of said sheave to move the same longitudinally of the gripping members.

16. In a machine for pointing blanks, a rotary chuck having means for clamping a plurality of blanks in axial alinement with their remote ends projecting beyond the end of said chuck, a plurality of cutters, means for moving said cutters into operative engagement with the projecting ends of said blanks.

17. In a machine for pointing blanks, a rotary chuck having means for clamping a plurality of blanks in axial alinement with their remote ends projecting beyond the ends of said chuck, a plurality of cutters, and means for causing relative movement between said cutters and said chuck to cause the cutters progressively to advance upon the ends of said blanks and to cause said blanks to traverse the face of said cutters.

18. In a machine for pointing pin blanks, a rotary chuck having means for clamping a plurality of blanks in axial alinement with their remote ends projecting beyond the ends of said chuck, a plurality of rotary cutters and means for reciprocating said chuck in a direction normal to its axis of rotation to present the ends of said blanks to said cutters.

19. In a machine for pointing pin blanks a rotary chuck having means for clamping a plurality of blanks in axial alinement with their remote ends projecting beyond the ends of said chuck, a plurality of rotary cutters, means for reciprocating said chuck in a direction normal to its axis of rotation to present the ends of said blanks to said cutters and means for oscillating said cutters into engagement with the ends of said blanks to reduce said ends to ogival form.

20. In a machine for cutting and pointing wire blanks to form double pointed pins, means for automatically feeding wire from a continuous coil, a chuck for receiving and clamping said wire and adapted to hold two blanks in axial alinement, means for severing a blank from said wire, means for rotating said chuck and means operable to cause said rotating means to close the chuck jaws upon said blank, a pair of cutters and means for reciprocating said chuck to present remote ends of two blanks held by said chuck to said cutters.

21. In a machine for cutting and pointing pins, means for feeding wire from a continuous coil, means for severing pin blanks from said wire, means for rotating said blanks and means for reducing the ends of said blanks to points, a chute for receiving the discharged blanks and a hopper having means for delivering said blanks in parallel arrangement to a suitable container.

In testimony whereof, I have signed my name to this specification.

HERMAN HEINE.